United States Patent Office 3,003,475
Patented Oct. 10, 1961

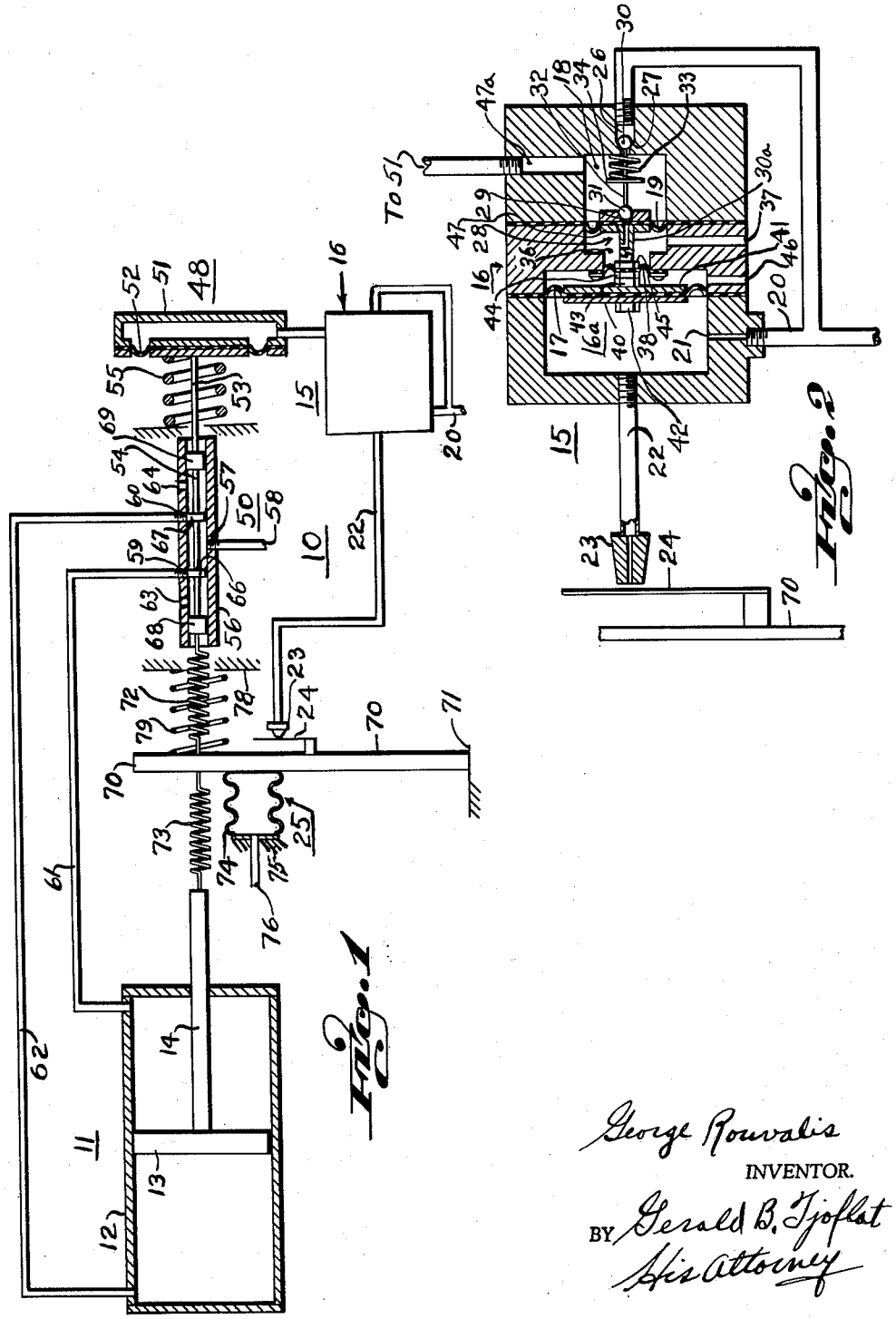

3,003,475
PNEUMATIC POSITIONING CONTROLLER
George Rouvalis, Orrville, Ohio, assignor to Hagan Chemicals & Controls, Inc., Pittsburgh, Pa., a corporation of Pennsylvania
Filed June 1, 1959, Ser. No. 817,316
11 Claims. (Cl. 121—41)

This invention relates to pneumatic positioning controllers.

Heretofore, it has been the practice to control the direction and motion of the piston of a power cylinder by means of a signal actuated pilot valve and a mechanical follow-up mechanism that return the pilot valve to neutral position whenever the piston had traveled a distance determined by the magnitude of the signal pressure and the return motion of the follow-up mechanism.

In accordance with this invention, a pneumatic positioning controller is provided for controlling an element, such as the piston of a power cylinder, both as to the direction and the extent of its motion without relying upon the old or prior art type of follow-up mechanism.

The pneumatic positioning controller of the invention is highly sensitive and extremely accurate in the control of the direction of motion and the extent of motion of a power cylinder piston, for example. The controller includes a highly sensitive, pneumatic operating signal pressure generator that is controlled by an input signal, a signal amplifier for developing an operating pressure of greater magnitude for the diaphragm of a pilot valve, and means for imposing a variable spring force on the pilot valve of such magnitude that the position of the pilot valve and hence the position of the controlled element will be proportional to the difference between the spring force and the input signal.

An object of this invention is to provide a pneumatic positioning controller that is extremely sensitive to a variable input signal, and highly accurate in the positioning of a controlled member such as the piston in a power cylinder, for example, in response to such input signal.

Another object is to provide a pilot valve system for controlling the position of an element, such as the piston in a power cylinder, in which the pilot valve is subjected to a spring force that is proportional to piston position and to a pneumatic operating pressure, whereby the position of the pilot valve, and hence the direction and increment of motion of the piston, are caused to be proportional to the difference between the pilot valve operating pressure and the spring force.

Other objects of the invention will be apparent to those of ordinary skill in the art to which the invention pertains from the following description taken in conjunction with the accompanying drawings.

In the drawings:

FIGURE 1 is a more or less schematic view of a pneumatic positioning controller embodying a form of the invention, as applied, for example, to the control of the direction and extent of motion of a piston in a power cylinder; and FIG. 2 is a view in section of a pneumatic amplifier embodied in the controller of FIG. 1.

In the drawings, a pneumatic positioning controller 10 is shown in a form representing what now appears to be a preferred embodiment of the invention. The controller may be used for controlling various devices, as for example, a power operator 11 shown as comprising a cylinder 12 having a piston 13 therein and a piston rod 14 extending through a suitable stuffing box (not shown) in one of the cylinder heads. The rod 14 may be connected to actuate a load or member (not shown) which may be a valve or other means employed to regulate a variable condition to a controlled value, which is a customary and well-known use for such power operators.

The particular power operator 11 illustrated may be one having a relatively large diameter and a relatively short stroke. Thus, for example, the power operator may be a 4" x 4" cylinder. Where the load requires a greater travel than four inches, the motion of the piston rod 14 may be amplified by or through a lever system or the equivalent.

The controller 10 comprises a pneumatic amplifier 15 which includes a body 16 having a chamber 16a therein provided with a diaphragm 17 and a chamber 18 provided with a diaphragm 19. Chamber 16 is provided with a source of supply of pressure 20 at constant value. That pressure is communicated to the chamber 16a through an orifice 21. Chamber 16a has an outlet pipe or tube 22 provided with a jet 23 at its discharge end. By obstructing the jet more or less, the pressure in chamber 16a, to which the diaphragm 17 is exposed, increases or decreases. The pressure increases as the jet is obstructed and decreases as the obstruction is lessened, because of the variations in the pressure drop across the orifice 21 resulting from changes in the rate of flow of air through it.

The rate of discharge of air from the jet 23 may be controlled by a flap 24 which is positioned initially by a signal input responsive means 25 and re-positioned in response to motion of the controlled element, namely, the power cylinder piston 13.

As shown, diaphragms 16 and 19 are mechanically connected so that they move together. Chamber 18 is provided with an inlet port 26 having a valve seat 27, while diaphragm 19 is provided with an exhaust valve assembly 28 which includes an exhaust port 29. The inlet and exhaust ports are controlled, respectively, by valve members 30 and 31 carried by a valve stem 32. The valve stem may be biased to seat the member 30 on the inlet port seat by means of a compression spring 33 disposed between a collar 34, fixed to the stem, and the roof of chamber 18.

The exhaust valve assembly comprises a bolt having in the head thereof the exhaust port 29 and a passage 30 in the shank 30a thereof, leading to a chamber 36 which is vented to the atmosphere through a way 37. The chamber 36 is formed by the diaphragm 19 and a small sealing diaphragm 38. The shank 30a extends through the sealing diaphragm 38, and backing plates 40 and 41 on the opposite sides of diaphragm 17. The central portion of diaphragm 17 is clamped between plates 40 and 41 by means of clamping nuts 42, 43 and 44, 45, respectively, threaded on shank 30a. The space between diaphragms 17 and 38 is vented to the atmosphere through a way 46. The central portion of diaphragm 19 is clamped tightly between the head of the valve bolt and a nut 47 threaded on the shank 30a as shown.

The chamber 18 has a pressure outlet port 47a leading to an operator 48 by which a pilot valve 50 is actuated. Valve 50 controls the admission of motivating pressure to one end or the other of the power cylinder 12, as described infra.

The magnitude of the pressure in chamber 16a is normally relatively low and, for the purposes of this invention, is considered inadequate for a proper operation of the pilot valve operator 48. Therefore, the areas of diaphragms 17 and 19 are so proportioned that the pressure in chamber 18 is greater than the pressure in chamber 16a by a predetermined multiple. For example, the area of diaphragm 17 may be three times that of diaphragm 19 so that the output pressure to operator 48 is three times the pressure in chamber 16a. The ratio of the areas of diaphragms 17 and 19 may be greater or less than 3:1, depending upon the magnification required in a given instance and the capacity of motive power required by the operator 48.

The pilot valve operator 48 comprises a housing 51 having a diaphragm 52 therein. The diaphragm 52 is connected to a stem 53 by which the valve 54 of the pilot valve 50 is actuated. The diaphragm 52 is resisted by a relatively strong or high rate compression spring 55.

The valve 50 comprises a body 56 having a supply port 57 to which motivating pressure at constant value may be supplied through a pipe 58. The body also includes outlet ports 59 and 60 which are connected by pipes 61 and 62, respectively, to the opposite ends of cylinder 12. The body is also provided with exhaust ports 63 and 64.

The valve 54 is provided with spaced lands 66–69. The lands 66 and 67 are spaced a distance equal to the distance between the outlet ports 59 and 60, and the supply port 57 is located between those ports. Thus, the lands 66 and 67 control the outlet ports 59 and 60. The lands 68 and 69 serve as plugs or closures for the ends of the body so that the exhaust from the cylinder 12 will be directed through one or the other of the exhaust ports 63 and 64, depending upon which end of the cylinder 12 is connected to exhaust.

If the position of the valve 54, as shown, be taken as the neutral or mid position, then motion of the valve to the left uncovers the outlet port 59 and puts it in communication with the supply pipe 58 whereby motivating pressure is admitted to the right-hand end of the cylinder 12, while at the same time the opposite end of the cylinder is connected to exhaust through port 60 and the port 64.

Motion of the valve 54 in the opposite direction places the port 60 in communication with the supply pipe 58 so that motivating pressure is supplied by pipe 62 to the left-hand end of cylinder 12, while the opposite end is connected to exhaust through pipe 61, the port 59 and the exhaust port 63.

As stated supra, the jet 23 is controlled by a baffle 24. That baffle may comprise a relatively thin, flat spring mounted on a beam 70, secured at one end to a fulcrum 71 which may comprise a flat leaf spring having a low spring rate.

The free end portion of the beam 70 is connected by a low rate spring 72 to the valve 54 and by a relatively light or low rate spring 73 to the piston rod 14. The beam 70 is moved about its fulcrum 71 by the signal input responsive means 25. As shown, that means comprises a bellows 74 which is secured at one end to a support 75 and at the other to the beam 70. Signal input pressure is introduced to the bellows 74 through a supply pipe 76. The signal supplied to the bellows 74 by the pipe 76 may represent a pneumatic signal that varies in magnitude by and in accordance with a variable condition to be controlled or regulated by motion of the piston rod 14.

Between the beam 70 and an abutment 78 is a relatively low rate compression spring 79. Springs 72, 73, and 78 may be of the same or equal magnitude.

When the signals to the bellows 74 are increasing, the baffle 24 is positioned towards the tip of the jet 23, whereby the pressure in chamber 16a is increased. Motion of the baffle in the opposite direction removes resistance at the tip of jet 23 thereby allowing more pressure to escape to the atmosphere and, by action of the orifice 21, reducing the pressure in chamber 16a.

If the pressure in chamber 16a is increasing, the force of that pressure on diaphragm 17 causes the exhaust valve assembly 28 to move upwardly and lift the valve element 30 off the inlet port seat 27 to admit and increase the pressure in chamber 18 until the force developed by that pressure on diaphragm 19 is sufficient to balance the force acting on diaphragm 17. Thus, if the pressure in chamber 16a at any given moment is $(x)$ p.s.i.g., the balancing pressure developed in chamber 18 will be $3(x)$ p.s.i.g. The pressure so developed in chamber 18 is the pressure that actuates the pilot valve 54 through the diaphragm 52.

If the flap 24 moves away from the tip of jet 23, the pressure in chamber 16a decreases. In that case, the diaphragm assembly 17 deflects towards the outlet port 22 carrying with it the exhaust valve assembly 28, whereby the exhaust port seat is uncovered and pressure in chamber 18 exhausts to the atmosphere until the force of the pressure in that chamber has been reduced to a value at which the force on diaphragm 17 balances the same. When in balance, the exhaust port is closed. Furthermore, at balance, both the exhaust and the inlet ports are closed; thus, the pressure in chamber 18 will remain at the balanced value until there is a further change in pressure in chamber 16a.

The design of the above described positioner is based on the premise that any motion of beam 70 will produce no discernible travel of pilot valve 54 other than that which is caused by changes in pressure on diaphragm 52 of the assembly 48. That is accomplished by utilizing a diaphragm 52 of relatively large area so as to acquire a spring 55 having a high rate, that is, a spring requiring a relatively large load to produce a given deflection, and making the spring system of beam 70, which system includes the fulcrum 71, and the springs 72, 73, and 79, a relatively low spring rate system, that is a system in which a relatively small force applied by bellows 74 to beam 70 will produce a given deflection of the beam without moving the pilot valve 54. Motion of the beam 70 changes the position of flap 24 with respect to jet 23, whereupon the resulting pressure change in chamber 16a is magnified to produce a magnified pressure for the diaphragm 52. The force produced by that pressure relative to the force of spring 55 results in motion of the pilot valve 54.

Thus, in the spring system of beam 70, the magnitudes of springs 72, 73, and 79 are of the same order with respect to each other.

If spring 79 were of the same magnitude as spring 55, any change in input pressure to bellows 74, which would be sufficient to produce motion of beam 70, would also be sufficient to drive the pilot valve 54 directly. In such a case, extremely large changes in input or error pressures to bellows 74 would be required, but that would be very undesirable because of the tendency to make the system regenerative.

*Operation*

If it be considered that the piston 13 in cylinder 12 is blocked so that the force of spring 73 is constant at a particular value, then, in response to an increase in the input pressure to bellows 74, beam 70 will rotate about its fulcrum 71 in clockwise direction, whereby the baffle 24 is moved closer to the tip of the nozzle 23. This results in a decrease in flow of air through orifice 21 into the chamber 16a, thereby increasing the pressure therein. That increase in pressure results in an increase in pressure in chamber 18 and in the diaphragm housing 51 of the pilot valve operator.

The pressure delivered to housing 51 of the operator 48 compresses spring 55, thereby moving the pilot valve 54 to the left, as seen in FIG. 1. The pilot valve will continue to move until sufficient tension has been removed from spring 72 to allow the beam 70 to come to balance with the forces acting on it.

If the input pressure to bellows 74 is less than the force of spring 73, beam 70 will rotate in a counterclockwise direction. The baffle 24, in that case, moves away from the tip of the jet 23 whereby a higher rate of air flow through the orifice 21 results in a reduction in pressure in chamber 16a with a consequent reduction in the magnified pressure in chamber 18. In response to the reduction in pressure in chamber 18, diaphragm spring 51 moves the pilot valve 54 to the right until the force of spring 72 balances the difference between the force developed by the input pressure in bellows 74 and the force developed by spring 73.

When the force developed by the input pressure to the bellows 74 is greater than the force exerted by spring 73, the pressure on diaphragm 52 is increased and the pilot valve 54 moves to the left. Conversely, if the force developed by the input pressure in bellows 74 is less than the force developed by spring 73, the pressure on diaphragm 52 is decreased and is moved to the right. When the forces of spring 73 and the bellows are balanced, the pilot valve 54 will have been returned by diaphragm 52 to neutral position.

The pneumatic positioning controller 10, when applied to a power cylinder, such as that indicated at 11, operates as follows: Assuming that the piston 13 is unblocked, that is, free to move, and the force developed by the input signal pressure to bellows 74 is greater than the force of spring 73, the pilot valve 54 moves to the left, whereby the right-hand end of the cylinder 12 is connected to the air supply furnished by the supply pipe 58, and at the same time the space in the cylinder at the right-hand end thereof is connected to exhaust through pipe 62, port 60, and the exhaust port 64. The piston 13 will then move to the left and, as it moves, it increases the force in spring 73 until that force is equal to the force generated by the input pressure to bellows 74, at which time the pilot valve 54 will have been returned to its neutral position. Thus, for any signal pressure input to the bellows 74, a definite increment of motion of piston 13 results. At that definite position, the pilot valve 54 will have been returned to its neutral position.

As stated supra, the power cylinder 11 may be one having a relatively short stroke and a relatively large diameter. If the position controller 10 is applied to a power cylinder having a much longer stroke, say a stroke of 10 to 15 inches, the spring 73 may be replaced by a special low rate spring connected directly to the piston rod or, the piston rod may be connected to that through a motion reduction mechanism, as will be readily understood by those skilled in the art.

Having thus described the invention, it will be apparent to those of ordinary skill in the art to which the invention pertains that various changes and modifications may be made in the illustrated embodiment, without departing from either the spirit or the scope of the invention.

Therefore, what is claimed as new and desired to be secured by Letters Patent is:

1. A pneumatic positioning controller for controlling the position of a controlled member comprising a pilot valve for supplying motive pressure to the controlled member, a diaphragm operator for actuating the pilot valve in one direction, means yieldingly urging the diaphragm operator and the pilot valve in the opposite direction, other yielding means connecting the pilot valve to the controlled member, a variable condition signal responsive actuated means connected to said other yielding means and disposed for actuation thereby in opposition to the force of said diaphragm urging means, and means controlled by said signal responsive actuated means for supplying operating pressure to the operator of the pilot valve, said means comprising a housing having a first chamber provided with a diaphragm, a source of supply pressure connected to said first chamber, an orifice through which the supply pressure passes to said first chamber, a jet connecting said first chamber to atmosphere, a baffle disposed adjacent the tip of said jet and actuated by the signal responsive actuated means from the jet in accordance with signal variations to the signal responsive actuated means, thereby increasing or decreasing the first chamber pressure as the baffle moves towards or away from the jet tip, a second chamber in said housing having a diaphragm therein, means rigidly connecting said diaphragms, an exhaust valve assembly carried by said second chamber diaphragm, said second chamber having a pressure supply port provided with an inlet valve seat, a valve member disposed to control the inlet and exhaust valve seats and being actuated by said first chamber diaphragm to open the inlet port seat when the force developed by the pressure on the diaphragm of the first chamber exceeds the force developed by the pressure on the diaphragm of the second chamber diaphragm, said valve ports being closed when the first and second chamber diaphragm forces balance each other, the exhaust port being opened when the force in the first diaphragm decreases with respect to the force of the second diaphragm, the pressure in the second chamber acting on the diaphragm of the pilot valve operator to acuate its pilot valve in such a direction as to change the direction of the forces on the baffle actuator so as to reposition the baffle to a position in which the forces developed by the diaphragms in the first and second chambers are in balance.

2. A pneumatic positioner for controlling the movement and position of an actuated member comprising a pilot valve for admitting pressure medium to the member, a diaphragm operator for actuating the valve in one direction and having yielding means urging the valve in the opposite direction, an input pressure signal responsive means, a jet control member actuated by said signal responsive means, a spring member connecting said jet control member to the pilot valve and to the actuated member, yielding means connected to exert a force on the jet control member in opposed relation to the force exerted by the pilot valve operating diaphragm, said jet control member being moved in one direction by the signal input means and in the opposite direction by motion of the pilot valve and the actuated member, and a controller for supplying operating pressure to the pilot valve operating diaphragm comprising a housing having a chamber and a diaphragm therein, said chamber being provided with a supply pressure inlet having an orifice therein and an outlet having a jet disposed to be variably obstructed by said jet control member thereby establishing a pressure on said chamber diaphragm that increases as the jet control member approaches the jet and decreases as it moves away from the same, and valve means actuated by said diaphragm for developing an operating pressure for the diaphragm of the pilot valve operator whose magnitude in linearly proportional to the pressure in said diaphragm chamber.

3. A positioner as in claim 2 in which the valve means is provided with a diaphragm connected to the jet chamber diaphragm in opposed force relation thereto and subjected to the operating pressure developed by said valve means, said valve means being in neutral position when the forces developed by the jet chamber diaphragm and the opposing diaphragm are in balance.

4. A positioner as in claim 3 in which the ratio of the area of the jet chamber diaphragm to the area of its opposing diaphragm is greater than 1:1, whereby the operating pressure developed by said valve means is greater than the jet chamber pressure.

5. A positioner as in claim 3 in which the ratio of the area of the jet chamber diaphragm to its opposing diaphragm is of the order of 3:1, whereby the operating pressure developed by said valve means is of the order of three times greater than the jet chamber pressure.

6. A pneumatic positioning controller as in claim 1 in which the ratio of the area of the first chamber diaphragm to the area of the second chamber diaphragm is greater than 1:1.

7. A pneumatic positioning controller as in claim 1 in which the ratio of the area of the diaphragm in the first chamber to the area of the second chamber diaphragm is of the order of 3:1.

8. In combination, a power cylinder having a reciprocating piston therein and a piston rod extending therefrom through an end of the cylinder, a pilot valve for admitting motive fluid to either end of the cylinder while exhausting from the other, a nozzle baffle control member having a pivot about which it rotates, tension springs connecting respectively, the piston rod to the baffle control member and the latter to the pilot valve, a pressure actuated diaphragm operator connected to the pilot valve, opposed compression springs, one of which engages the diaphragm of the operator to resist the force developed by pressure thereon and the other acting on the baffle control member, and a controller having a variable pressure responsive force producing means and a jet controlled by the baffle control member for varying the pressure on the said means, valve means actuated by said variable pressure responsive means for generating operating pressure for the diaphragm operator, and means responsive to said operating pressure for balancing the force of said force producing means, said springs acting on said baffle control member to position the same in the same direction as the piston of the power cylinder travels in response to actuation of the pilot valve, thereby repositioning the baffle control member after each change in signal to said signal input means.

9. A combination as in claim 8 in which the balancing means for the valve means that supplies pressure to the pilot valve operator is so arranged as to provide balance at a ratio of balance pressure to baffle controlled pressure which is greater than 1:1.

10. A combination as in claim 8 in which the tension springs connecting the piston rod to the baffle control member and to the pilot valve, and the opposed compression spring that engages the baffle control member, are of relatively low magnitude and have a relatively low spring rate and the spring which opposes the diaphragm operator is one having a relatively high spring rate and is of a relatively high magnitude.

11. A combination as in claim 10 in which the balancing means for the valve means that supplies pressure to the pilot valve operator is so arranged as to provide balance at a ratio of balanced pressure to baffle controlled pressure which is greater than 1:1.

References Cited in the file of this patent

UNITED STATES PATENTS

| 2,146,176 | Donaldson | Feb. 7, 1939 |
| 2,443,891 | Buerschaper | June 22, 1948 |
| 2,668,556 | Meyer | Feb. 9, 1954 |
| 2,722,198 | MacGeorge | Nov. 1, 1955 |
| 2,780,230 | Freeman | Feb. 5, 1957 |
| 2,896,588 | Hayner et al. | July 28, 1959 |

OTHER REFERENCES

Builders Iron Foundry Publication No. 285.20A-1; January 1959; copy in 137-85, Division 28.

UNITED STATES PATENT OFFICE
CERTIFICATE OF CORRECTION

Patent No. 3,003,475

October 10, 1961

George Rouvalis

It is hereby certified that error appears in the above numbered patent requiring correction and that the said Letters Patent should read as corrected below.

Column 5, line 2, for "73." read -- 73, --; line 65, after "means" insert -- toward or away --; column 6, line 10, for "acuate" read -- actuate --; line 41, for "in", first occurrence, read -- is --.

Signed and sealed this 20th day of March 1962.

(SEAL)
Attest:

ERNEST W. SWIDER
Attesting Officer

DAVID L. LADD
Commissioner of Patents